US010511452B2

(12) United States Patent
Ahn et al.

(10) Patent No.: US 10,511,452 B2
(45) Date of Patent: *Dec. 17, 2019

(54) BLOCKCHAIN FOR OPEN SCIENTIFIC RESEARCH

(71) Applicant: International Business Machines Corporation, Armonk, NY (US)

(72) Inventors: Jae-Wook Ahn, Nanuet, NY (US); Maria D. Chang, Irvington, NY (US); Ravindranath Kokku, Yorktown Heights, NY (US); Patrick Watson, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/842,659

(22) Filed: Dec. 14, 2017

(65) Prior Publication Data

US 2018/0323980 A1  Nov. 8, 2018

Related U.S. Application Data

(63) Continuation of application No. 15/588,387, filed on May 5, 2017.

(51) Int. Cl.
*H04L 9/32* (2006.01)
*G06F 21/62* (2013.01)
(Continued)

(52) U.S. Cl.
CPC ........ *H04L 9/3297* (2013.01); *G06F 21/6209* (2013.01); *G06F 21/64* (2013.01);
(Continued)

(58) Field of Classification Search
CPC ... H04L 9/3297; H04L 9/0631; H04L 9/0637; H04L 9/0643; H04L 9/3236; G06F 21/6209; G06F 21/64; G06F 21/606
(Continued)

(56) References Cited

U.S. PATENT DOCUMENTS 7,404,079 B2   7/2008  Gudbjartsson et al.
7,860,760 B2  12/2010  Smith
(Continued)

OTHER PUBLICATIONS

Hutchinson, et al., "High drug attrition rates—where are we going wrong?," Nature Reviews Clinical Oncology 8, 2011, pp. 189-190, 2 pages.
(Continued)

*Primary Examiner* — Michael S McNally
(74) *Attorney, Agent, or Firm* — Amin, Turocy & Watson, LLP

(57) ABSTRACT

Techniques facilitating using a blockchain system that integrates the trustworthiness of the blockchain concept with open scientific research by generating a blockchain of the experiments formed, data collected, analyses performed, and results achieved are provided herein. In an example, the blockchain system can form a blockchain representing a research project, wherein the blockchain comprises a first block of research data and a second block of analysis data representing a log of an analysis performed on the research data. Summary blocks and correction blocks can also be added to the blockchain representing the post analysis of the research results. One or more of the subsequent blocks can be linked to the preceding blocks using information in block headers that can also serve to determine whether modifications to the blocks have been performed.

14 Claims, 12 Drawing Sheets

(51) Int. Cl.
*H04L 9/06* (2006.01)
*G06F 21/64* (2013.01)
*G06F 21/60* (2013.01)

(52) U.S. Cl.
CPC .......... *H04L 9/0631* (2013.01); *H04L 9/0637* (2013.01); *H04L 9/0643* (2013.01); *H04L 9/3236* (2013.01); *G06F 21/606* (2013.01); *G06F 2221/2107* (2013.01); *H04L 2209/38* (2013.01); *H04L 2209/60* (2013.01)

(58) Field of Classification Search
USPC ........................................................ 713/178
See application file for complete search history.

(56) References Cited

U.S. PATENT DOCUMENTS

| | | | |
|---|---|---|---|
| 8,316,237 | B1 | 11/2012 | Felsher et al. |
| 8,805,925 | B2 | 8/2014 | Price et al. |
| 2008/0027782 | A1 | 1/2008 | Freire et al. |
| 2008/0040181 | A1 | 2/2008 | Freire et al. |
| 2013/0304761 | A1 | 11/2013 | Redlich et al. |
| 2014/0344015 | A1 | 11/2014 | Puertolas-Montanes et al. |
| 2015/0332283 | A1 | 11/2015 | Witchey |
| 2015/0379510 | A1 | 12/2015 | Smith |
| 2016/0027229 | A1* | 1/2016 | Spanos .................. G07C 13/00 705/51 |
| 2016/0191243 | A1 | 6/2016 | Manning |
| 2017/0103167 | A1* | 4/2017 | Shah .................... G06F 11/1464 |
| 2017/0116693 | A1 | 4/2017 | Rae et al. |
| 2019/0013948 | A1* | 1/2019 | Mercuri ................ G06Q 20/02 |

OTHER PUBLICATIONS

Bartling, et al., "Could Blockchain provide the technical fix to solve science's reproducibility crisis?," blogs.lse.ac.uk, 2016, 5 pages.
Elsethagen, et al., "Data Provenance Hybridization Supporting Extreme-Scale Scientific Workflow Applications," NYSDS, 2016, 28 pages.
Topol, "Money back guarantees for non-reproducible results?" The BMJ, 2016, 2 pages.
Irving, et al., "How Blockchain-Timestamped Protocols could Improve the Trustworthiness of Medical Science," F1000Research, 2016, 6 pages.
The Open Science Framework: osf.io, accessed May 4, 2017.
Imran, et al., "Provenance Framework for the Cloud Infrastructure: Why and How?," International Journal on Advances in Intelligent Systems, vol. 6 No. 1 & 2, 2013, 12 pages.
International Search Report and Written Opinion for PCT/IB2017/057814, dated Mar. 28, 2018, 10 pages.
Mell, Peter, et al. "The NIST Definition of Cloud Computing." National Institute of Standards and Technology. Sep. 2011. 7 pages.
Notice of Allowance for U.S. Appl. No. 15/588,387 dated Jan. 23, 2019, 40 pages.

* cited by examiner

BLOCKCHAIN FOR OPEN SCIENTIFIC RESEARCH

BACKGROUND

The subject disclosure relates to integrating a blockchain and data collection and analysis for open scientific research. Currently, there are limited platforms that allow for sharing information about scientific research and showing transparent data collection and analysis steps. Platforms that do exist, lack the requisite controls and mechanisms to allow for trustworthy data, as there are few options for ensuring that data will be resistant to modification.

For example, as described in Topol, *Money Back Guarantees for Non-Reproducible Results*, BMJ 2016, 353:i2770, published 24 May 2016, it is acknowledged that "[t]he problem of irreproducibility in biomedical research is real and has been emphasized in multiple reports" and that "use of blockchain technology has recently been shown to provide an immutable ledger of every step in a clinical research protocol, and this could easily be adapted to basic and experimental model science. All participants in the peer-to-peer research network have access to all of the time stamped, continuously updated data. It is essentially tamper proof since any change, such as to the pre-specified data analysis, would have to be made in every computer (typically thousands) within the distributed network." While Topol describes the problem of data transparency and proposes that blockchain could serve as a solution. It describes researchers as having access to time-stamped immutable data through a public blockchain. It does not describe 1) mixed confidentiality policies, 2) researchers having access to real-time logs of analyses (only to changes to an analysis plan), 3) blockchain logging of the analytical steps via connection of analytical software to a blockchain contract, 4) any methods or algorithms to assess the statistical power of the underlying result by analysis of steps on the blockchain (for example, automatic correction for multiple analyses) or 5) any integrated algorithms or blockchain contracts that perform functions other than a) a public record of data transactions and b) refunds based on detection of a violation of data provenance.

Similarly, Irving et al., *How Blockchain-Timestamped Protocols could Improve the Trustworthiness of Medical Science*, F1000Research 2016, 5:222, last updated 31 May 2016 discloses a "report a proof-of-concept study using a 'blockchain' as a low cost, independently verifiable method that could be widely and readily used to audit and confirm the reliability of scientific studies." Similar to Topol above, Irving does not disclose points 1-5 above.

U.S. Pat. No. 7,404,079 to Gudbjartsson et al. discloses "an automated system for the processing of data packets, composed of identifiers and data, such that the personally identifiable data sent by one party may be considered anonymous once received by a second party. The invention uses secret sharing techniques to facilitate distributed key management of the mapping functions and strong authentication to allow the system to be operated remotely." Gudbjartsson discloses a mixed security policy that could be an example of one that could be utilized as a prior contract for the invention described here. However it is not the only such security contract that could be used, and it differs from the subject disclosure in that: 1) it is an up-front security contract between all parties, rather than a security policy defined by the a party at the time they expose data to the blockchain; 2) it does not specify a public blockchain ledger; 3) it does not name methods for analyzing the ledger to assess the robustness of data; and 4) it does not specify a smart contract that treats reported or analyzed data differently from raw data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processors for blockchain formation are described. The disadvantages of the references discussed above in the background have been resolved with the features disclosed herein.

According to an embodiment, a computer-implemented method is provided. The computer-implemented method can comprise generating, by a device operatively coupled to a processor, a first block from a first file, where the first block comprises a first header and experimental data is comprised within the first file, where the first header further comprises a first time stamp, an identifier that identifies a source of the experimental data, and a first hash based on the experimental data; and generating, by the device, a second block based on a second file that comprises a log of an analysis performed on the experimental data, wherein the second block comprises the log of the analysis and a second header that comprises a second time stamp, a link to the first block, and a second hash based on the log of the analysis. According to this embodiment, an advantage is realized over the prior art because a blockchain is formed based on the data collected and analyses are performed to provide a tamper resistant log of scientific research.

In an optional embodiment, the computer-implemented method further comprises: performing, by the device, a correction to the result of the analysis based on a review of the summary of the experimental data of the third block; generating, by the device, a fourth block comprising the correction; and joining, by the device, the fourth block to the blockchain. According to this embodiment, an advantage is realized over the prior art because the result of the analysis is corrected thereby resulting in greater reliability and accuracy.

In an optional embodiment, the computer-implemented method further comprises encrypting, by the device, the experimental data and the log of the analysis prior to forming the first block and second block respectively. According to this embodiment, an advantage is realized over the prior art because the experimental data and the log of the analysis is encrypted prior to forming the first and second blocks thereby increasing security and reducing opportunities for tampering with and/or otherwise altering such information.

In another embodiment, a system can comprise a memory that stores computer executable components and a processor that executes the computer executable components stored in the memory. The computer executable component can comprise a data collection component that creates a master data block from a data entry blockchain, where the data entry blockchain comprises a group of data entry blocks that are linked to each other, and where the master data block comprises a first header and data from the data entry blocks. The header can further comprise a first time stamp, an identifier that identifies a source of the data, and a first hash based on the data. The computer executable components can also comprise an analysis component that creates an analysis block comprising log of an analysis performed on the data and a second header that comprises a second time stamp, a link to the master data block, and a second hash based on the log of the analysis, where the analysis block and the master data block comprise a blockchain. According to this embodiment, an advantage is realized over the prior art because a blockchain is formed based on the data collected and analyses are performed to provide a tamper resistant log of scientific research.

In an optional embodiment, the computer executable components can include a correction component that rates a reliability of the result of the analysis based on the summary of the analysis and the log of the analysis, where the reliability is associated with a number of attempts to achieve the result of the analysis. This reliability rating is an advantage over the prior art as it provides an objective basis for determining the amount of trust that should be placed in a result of the scientific research or in the conclusion reached.

In another embodiment, a computer-implemented method is provided. The computer-implemented method can comprise forming, by a device operatively coupled to a processor, a blockchain representing a research project, where the blockchain comprises a first block of research data, and a second block of analysis data representing a log of an analysis performed on the research data. The computer-implemented method can also comprise forming, by the device, a summary block comprising a summary of the research data and summary of the analysis data. The computer-implemented method can also comprise appending, by the device, the summary block to the blockchain. The summary block provided in this embodiment can be added to the blockchain and represent conclusions reached by researchers and provide a template for facilitating publishing a scientific paper on the research.

In another embodiment, a system can comprise a memory that stores computer executable components and a processor that executes the computer executable components stored in the memory. The computer executable components can comprise: a data collection component that: receives a first file having experimental data; and generates a first block from the first file, where the first block comprises a first header and the experimental data, and where the header further comprises a first time stamp, an identifier that identifies a source of the experimental data, and a first hash based on the experimental data. The computer-executable components can also comprise an analysis component that generates a second block based on a second file that comprises a log of an analysis performed on the experimental data, where the second block comprises the log of the analysis and a second header that comprises a second time stamp, a link to the first block, and a second hash based on the log of the analysis; and an inspection component that generates a third block comprising a summary of the experimental data and the analysis and a result of the analysis. According to this embodiment, an advantage is realized over the prior art because a blockchain is formed based on the data collected and analyses are performed to provide a tamper resistant log of scientific research.

In an optional embodiment, the computer executable components further comprise a correction component that rates a reliability of the result of the analysis based on the summary of the analysis and the log of the analysis, wherein the reliability is associated with a number of attempts to achieve the result of the analysis. According to this embodiment, an advantage is realized over the prior art because the reliability of the result of the analysis is rated.

According to yet another embodiment, a computer program product to generate a blockchain using open scientific data is provided. The computer program product can comprise a computer readable storage medium having program instructions embodied therewith. The program instructions can be executable by a processor and cause the processor to generate a master data block from a data entry blockchain, where the data entry blockchain comprises a group of data entry blocks that are linked to each other, where the master data block comprises a first header and data from the data entry blocks, and where the header further comprises a first time stamp, an identifier that identifies a source of the data, and a first hash based on the data. The processor can also generate an analysis block comprising a log of an analysis performed on the data and a second header that comprises a second time stamp, a link to the master data block, and a second hash based on the log of the analysis, where the analysis block and the master data block comprise a blockchain. According to this embodiment, an advantage is realized over the prior art because a blockchain is formed based on the data collected and analyses are performed to provide a tamper resistant log of scientific research.

In an optional embodiment, the program instructions are further executable to cause the processor to rate a reliability of the result of the analysis based on the summary of the analysis and the log of the analysis, wherein the reliability is associated with a number of attempts to achieve the result of the analysis. According to this embodiment, an advantage is realized over the prior art because the reliability of the result of the analysis is determined employing an evaluation of the summary of the analysis and the log of the analysis.

DETAILED DESCRIPTION

Figure 1:
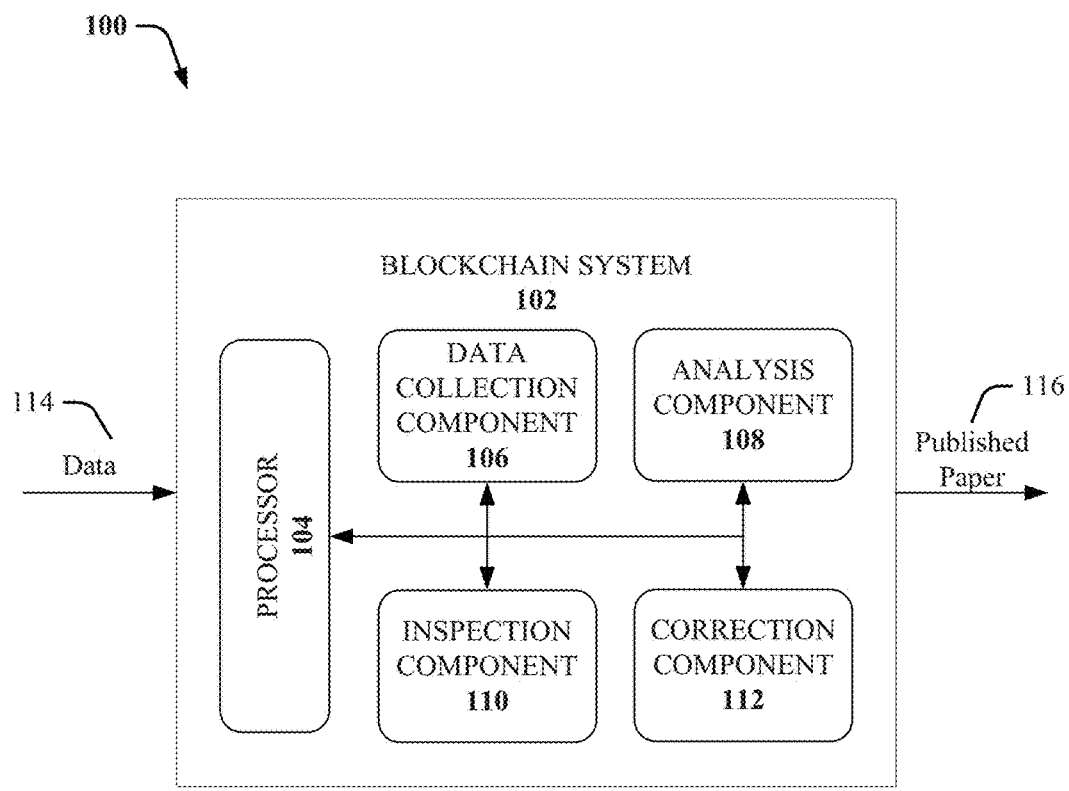
FIG. 1 illustrates a high-level block diagram of an example, non-limiting blockchain system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The advantages and contribution of this disclosure include 1) mixed confidentiality policies, 2) researchers having access to real-time logs of analyses (and not only to changes to an analysis plan), 3) blockchain logging of the analytical steps via connection of analytical software to a blockchain contract, 4) any methods or algorithms to assess the statistical power of the underlying result by analysis of steps on the blockchain (for example, automatic correction or reliability rating for multiple analyses) and/or 5) any integrated algorithms or blockchain contracts that perform functions other than a) a public record of data transactions and b) refunds based on detection of a violation of data provenance.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Currently, problems exist because there are limited platforms that allow for sharing information about scientific research and showing transparent data collection and analysis steps. As a result, various contributors to research and/or publications may not receive accurate and/or full recognition for work performed. Further, platforms that do exist, lack the requisite controls and mechanisms to allow for trustworthy data, as there are few options for ensuring that data will be resistant to modification.

In various embodiments disclosed herein, solutions address the above problems. For example, in one or more embodiments, provided is a blockchain system that integrates the trustworthiness of the blockchain concept with open scientific research by generating a blockchain of the experiments formed, data collected, analyses performed, and/or results achieved. Integrating the scientific process with the blockchain process can improve the trustworthiness and/or reproducibility of the data and/or results due to the inherently modification resistant properties of the blockchain. The blockchain can also be used to analyze the reliability and provenance of the data. The blockchain system can form a blockchain representing a research project, wherein the blockchain comprises a first block of research data and a second block of analysis data representing a log of an analysis performed on the research data. Summary blocks and correction blocks can also be added to the blockchain representing the post analysis of the research results. Subsequent blocks can be linked to the preceding blocks using information in block headers that can also serve to determine whether modifications to the blocks have been performed, while also preserving the confidentiality interests in the research data.

In an embodiment, this disclosure can also provide a way for scientists and other researchers to conduct experiments and/or otherwise collect research data, perform analyses on the data, arrive at conclusions, perform corrections, and/or track and log their work in order for other researchers and scientists to perform peer reviews, try to reproduce results, and/or generally consider the relevance and importance of the research without worrying whether the data or results had been manipulated by the original researchers or at any other step during the process. The blockchain system can be integrated into a cloud system and track data that is uploaded to public databases in some embodiments. In some embodiments, the blockchain system can also be integrated onto researcher consoles and other applications that perform data collection and analysis in order to obtain a real-time update of analyses being performed on the data. In an embodiment, the blockchain system can also facilitate working with non-public research data. Instead of using data from public databases, the data can be retrieved from non-public databases and encrypted. The blockchain system can form blockchains from the data and analysis information that is encrypted.

Turning now to FIG. 1, illustrated is a high-level block diagram 100 of an example, non-limiting blockchain system 102 in accordance with one or more embodiments described herein. In FIG. 1, the blockchain system 102 can include a processor 104, a data collection component 106, an analysis component 108, an inspection component 110, and a correction component 112. In various embodiments, one or more of the processor 104, a data collection component 106, an analysis component 108, an inspection component 110, and a correction component 112 can be electrically and/or communicatively coupled to one another to perform one or more functions of the blockchain system 102. The blockchain system 102 can receive data 114 from scientific experiments, and generate papers 116 or processed information ready for publishing.

In some embodiments, the blockchain system 102 can be a cloud based system that enables the formation of a blockchain of various steps in the experimental/scientific research process. In other embodiments, blockchain system 102 can be based on a network or device that is performing the data collection and analysis or is communicably coupled to the system executing the program. In an embodiment, the blockchain system 102 can include a processor 104 that executes computer executable components stored in the memory. The components can include a data collection component 106 that can create a master data block (e.g., data block 206) from a data entry blockchain. The data entry blockchain can be based on data 114 received from data collection steps in a scientific experiment or from a public ledger (e.g., see FIG. 2). The data entry blockchain can comprise a group of data entry blocks (e.g., data blocks 402 and/or 404) that are linked to each other. Blocks are linked when hashes of previous blocks are included in the headers of subsequent blocks. Since each block can have a unique hash, a linked hash in the header is a reference back to a specific block, thus a blockchain of blocks. The master data block can comprise a first header and/or data from the data entry blocks. The header can further comprises a first time stamp representing when the data was collected or the master data block formed and/or uploaded to a public ledger. The header can also include an identifier that identifies a source of the data, and a first hash based on the data. The identifier can be a serial number associated with a research group or scientist, or can be associated with a apparatus that collects data (e.g., measurement device, etc).

The analysis component 108 can generate an analysis block (e.g., analysis blocks 502 or 504) that can comprise data representing a log of an analysis performed on the data and/or a second header that comprises a second time stamp (e.g., when the analysis block was formed), a URL link to the master data block, and/or a second hash based on the log of the analysis, wherein the analysis block and/or the master data block comprise a blockchain (e.g., linked blocks). The log of an analysis can be based on a console output of a researcher tracking the calculations and other modeling performed by the researchers. The log can include both the operations and algorithms performed on the data, and the results of the processing.

The inspection component 110 can create a summary block or inspection component (e.g., inspection component 602) comprising a summary of the data, a summary of the analysis and a result of the analysis, and/or a third header comprising a link to the analysis block. The components can also include a correction component 112 that rates a reliability of the result of the analysis based on the summary of the analysis and/or the log of the analysis, wherein the reliability is associated with a number of attempts to achieve the result of the analysis. For instance, an analysis sequence with many steps and/or attempts to match data to a model might have a lower reliability rating than an analysis sequence with fewer steps.

The blockchain system 102 and/or the components of the blockchain system 102 can employ hardware and/or software to solve problems that are highly technical in nature (e.g., related to bioinformatics, authentication, compression, big data analysis etc.), that are not abstract and that cannot be performed as a set of mental acts by a human. The blockchain system 102 and/or components of the system can be employed to solve new problems that arise through advancements in technology (e.g., provenance of data, reliability/integrity of research), computer networks, the Internet and/or the like.

A processor 104 can be associated with at least one of a central processor, a graphical processor, etc. In various embodiments, the processor 104 can be or include hardware, software (e.g., a set of threads, a set of processes, software in execution, etc.) or a combination of hardware and/or software that performs a computing task for machine learning (e.g., a machine learning computing task associated with received data). For example, the processor 104 can execute data analysis threads that cannot be performed by a human (e.g., are greater than the capability of a single human mind). For example, the amount of data processed, the speed of processing of the data and/or the data types processed by processor 104 over a certain period of time can be respectively greater, faster and different than the amount, speed and data type that can be processed by a single human mind over the same period of time. For example, data processed by processor 104 can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices. Moreover, processor 104 can be fully operational towards performing one or more other functions (e.g., fully powered on, fully executed, etc.) while also processing the above-referenced data analysis data and runtime environment data.

Figure 2:
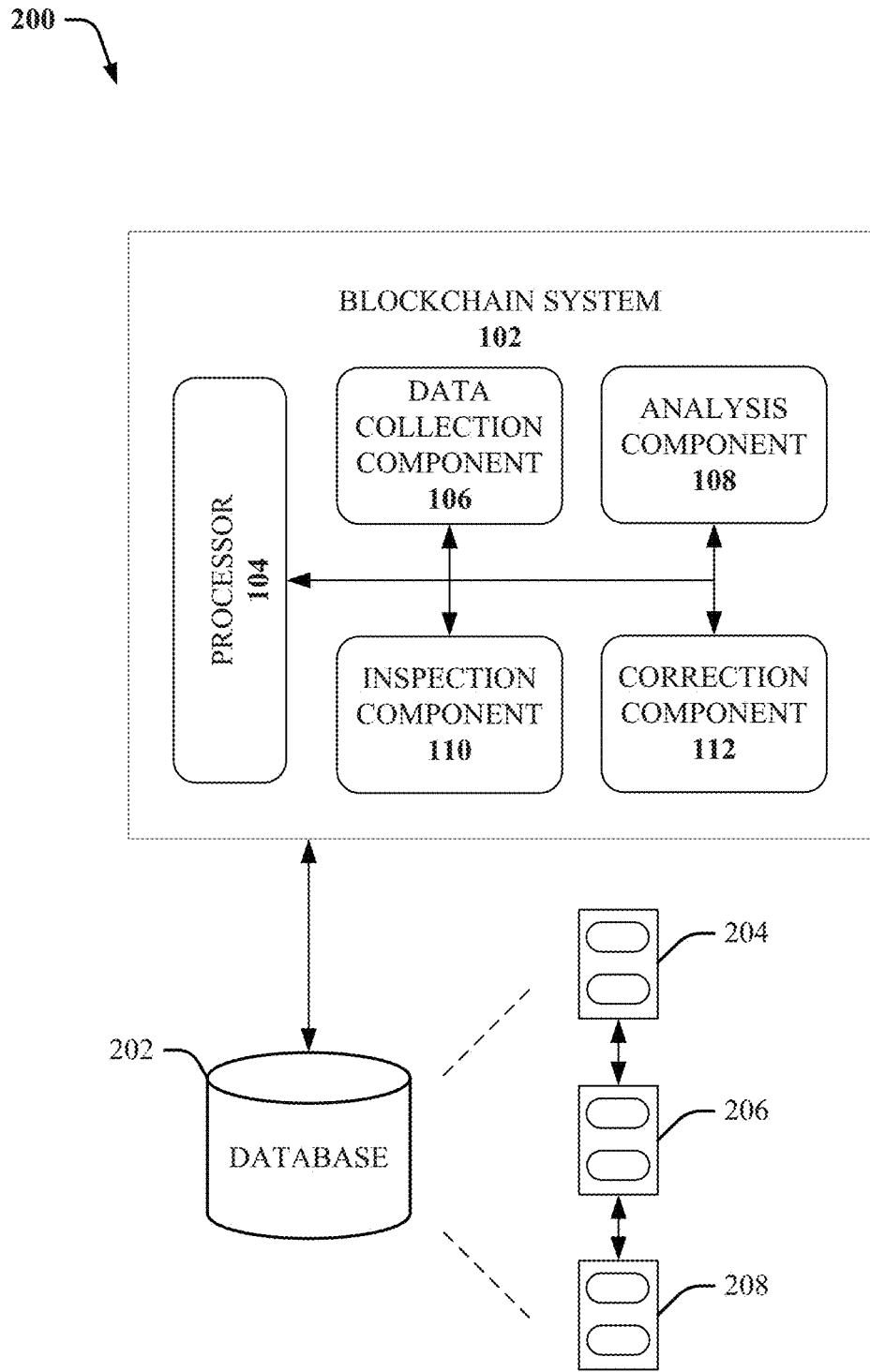
FIG. 2 illustrates another high-level block diagram of an example, non-limiting blockchain system in accordance with one or more embodiments described herein.

Turning now to FIG. 2, illustrated is another high-level block diagram 200 of the example, non-limiting blockchain system 102 in accordance with one or more embodiments described herein. Repetitive description of like elements employed in other embodiments described herein is omitted for sake of brevity.

In an embodiment, the data collection component 106 can receive the research and/or experimental data from a database 202. The database 202 can be a public ledger or non-public database associated with one or more of the research groups. The database can store the data in block form, such as depicted by blocks 204, 206, and/or 208 with headers and/or data portions. In a embodiments, the database 202 can store the data in raw form, separated by experiments performed, researchers who collected the data, subjects, participants, or other distinguishing elements.

Figure 3:
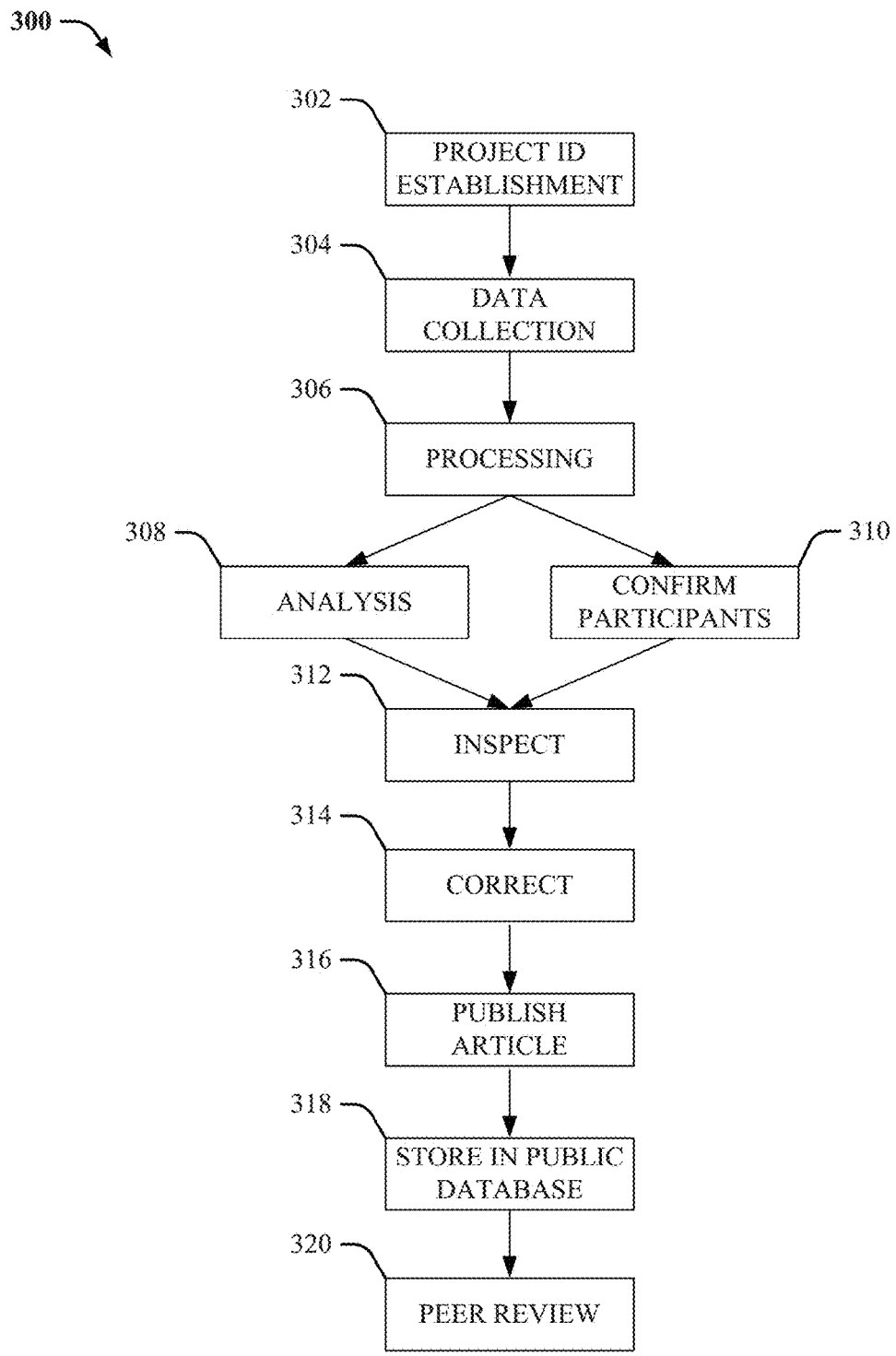
FIG. 3 illustrates a flow diagram of an example, non-limiting method of integrating blockchain functionality with open scientific research in accordance with one or more embodiments described herein.

Turning now to FIG. 3 illustrated a flow diagram of an example, non-limiting computer-implemented method 300 of integrating blockchain functionality with open scientific research in accordance with one or more embodiments described herein. Repetitive description of like elements employed in other embodiments described herein is omitted for sake of brevity.

In an embodiment, the flow diagram can begin at 302, where the experiment or project identifier (ID) can be retrieved and/or otherwise established. The project ID can be used in the headers of the blocks forming the blockchain as a way to identify the blockchain and associate it with the experiment or research project.

The project ID can be attached to the data that is collected at 304. The data collected at 304 can be associated with the data from the research project or experiment, and can include data that was collected from a project or experiment that was formerly conducted, or data that is collected as the project or experiment is proceeding. The data can include data collected from one or more scientific instruments, from people providing feedback (e.g., interviews, observational data, etc) or other data retrieved via online assessments, data harvesting, big data collection, and etc.

In an embodiment, the data collected at 304 can be separated into datasets from individuals, groups of researchers, or different experiments or the same experiments conducted at different times. In an embodiment, the blockchain system can generate a block comprising the data, and in other embodiments, the blockchain system can generate separate blocks, wherein separate datasets are formed into a block. The blocks can comprise a data portion and/or a header, with the header comprising the project ID and other information that can be used to link the blocks together. In an embodiment, the blocks can be formed into a blockchain to preserve the data and make it resistant to modification. The blocks are formed into a blockchain by including a hash of the previous block in the header of a subsequent block. The chain of hashes from earlier blocks to later blocks results in the blockchain, and they are resistant to modification due to the nature of the hash. Since a hash is a unique number based on the data inside each block, if there is any change in data, a new hash results. The new hash would cause a discontinuity in the blockchain, eliminating the blockchain.

In an embodiment, the data can be collected from, or the blockchain stored on, a public or non-public database. The links that link the blocks in the blockchain can be a uniform resource locator (URL) or other database link. In some embodiments, the link can be the hash of the previous block. If a first block is hashed, the hash can uniquely identify that block, and a subsequent block can be linked to the first block by including the hash of the first block in the header of the second block.

In an embodiment, in response to the data being collected at 304 (e.g., by data collection component 106), the data can be written into a block, or, in other embodiments, a block is formed based on the data. As another or subsequent block is created, then it can be linked to the first/previous block. A timestamp can be included in the header as well to identify the order in which the blocks were received. In cases where blocks are collected at the same time and therefore have the same timestamp, the order in which the blocks are written to an online database and/or server (e.g., database 202) or collected can establish the order the blocks are located within the blockchain.

At 306, the analysis component 108 can perform processing. By way of example, but not limitation, processing can include adding blocks to the blockchain representing initial data reduction not related to the formal analysis of fitting data to the one or more models. Data reduction and other processing steps can be included in processing 306. These steps can include the generation of the has by the processor 104 that performs a hashing function that generates a unique number based on the data in the blocks. In other embodiments, the processing steps can include data reduction, manipulation, and other processing steps performed on the data to organize the raw data. The processing steps can also be calculations and other algorithms performed on the data to try to conform the data to one or more hypothesized models. The processing can also include other data modeling functions performed on the data collected at 304.

In an embodiment, the processing steps can be determined based on one or more analysis logs collected from the research group, a public or non-public database, or the console application that performed the analysis. In an embodiment, the blockchain system can generate an analysis block comprising the steps, and a header with information used to link the analysis block to the blockchain formed at 304.

At 308, the analysis component 108 can generate a series of analysis blocks, where one or more analysis blocks is associated with one or more of the calculations, and other processing functions. In this way, the processing steps can be preserved on the blockchain for inspection and correction at a later time. In an embodiment, one or more of the analysis blocks can correspond to separate data blocks, or include one or more analyses performed on a data set associated with the data block.

At 310, the inspection component 110 can confirm the participants in both the processing/analysis steps at 306 and/or 308, as well as during the data collection at 304. Confirming the participants can include, but is not limited to, inspecting the headers of one or more of the data blocks to determine the source of the data, and which researcher, research group, or other participant accessed and/or modified the data via the one or more analysis steps.

It is to be appreciated that at one or more of these preceding and subsequent steps, the blockchain system can update the blockchain on the public or non-public ledger/database in real-time or at predefined intervals (e.g., every x minutes, or when a block is added to the blockchain) so that other entities can access the blockchain to inspect the blockchain, and see the research process.

At 312, the inspection process is performed where the inspection component 110 can summarize the data and analyses steps 306, 308 performed previously, and determine a result of the research project or other conclusion. In an embodiment, the inspection component can include just the headers of the data blocks and the analysis blocks to link back to. In an additional embodiment, the inspection component can have a header that includes a hash that is the hash of the last analysis block.

The inspection step 312 can also take information and/or data about the research project or experiment that is outside the blockchain, and compare it to the results and data reported in the blockchain to confirm the veracity and reliability of the outside information.

In another embodiment, the blockchain system 102 can include one or more protocols whereby the inspection component is not added to the blockchain or otherwise registered until it is confirmed that the inspection component incorporates the outputs of the analyst blocks and their hashes. Including the hashes ensures that not only the identify of which block in the blockchain results in the outcome, but that you can also verify the reliability of the block and the outcome with the hash.

At 314, the correction component 112 can perform a correction whereby the relative reliability or importance of the research and/or experimental conclusions can be determined. For instance, if relatively few analyses steps or modifications of the processing algorithms are required to achieve the hypothesized result, then the experiment or research conclusion can have a more highly weighted importance than if many modifications are performed. The blockchain system can determine how many modifications are performed by determining which of the analysis blocks resulted in the outcome—if an early analysis block resulted in the outcome, than the result can be weighted higher than if a later analysis block resulted in the outcome. The blockchain system can also determine the weighting based on the types of modifications reported in the analysis blocks.

At 316, the correction component 112 can assist in the publication of the research project. The blockchain system can access the data block(s), analysis block(s), inspection component(s) (which comprise the summary and outcome), and the correction block(s) to gather the data, and format it for publishing and otherwise make the information easily accessible to one or more of the researchers when writing the article.

At 318, the inspection component 110 can finalize, and store the blockchain and other information on one or more public ledgers or databases, or non-public databases for peer review which can take place at 320.

Figure 4:
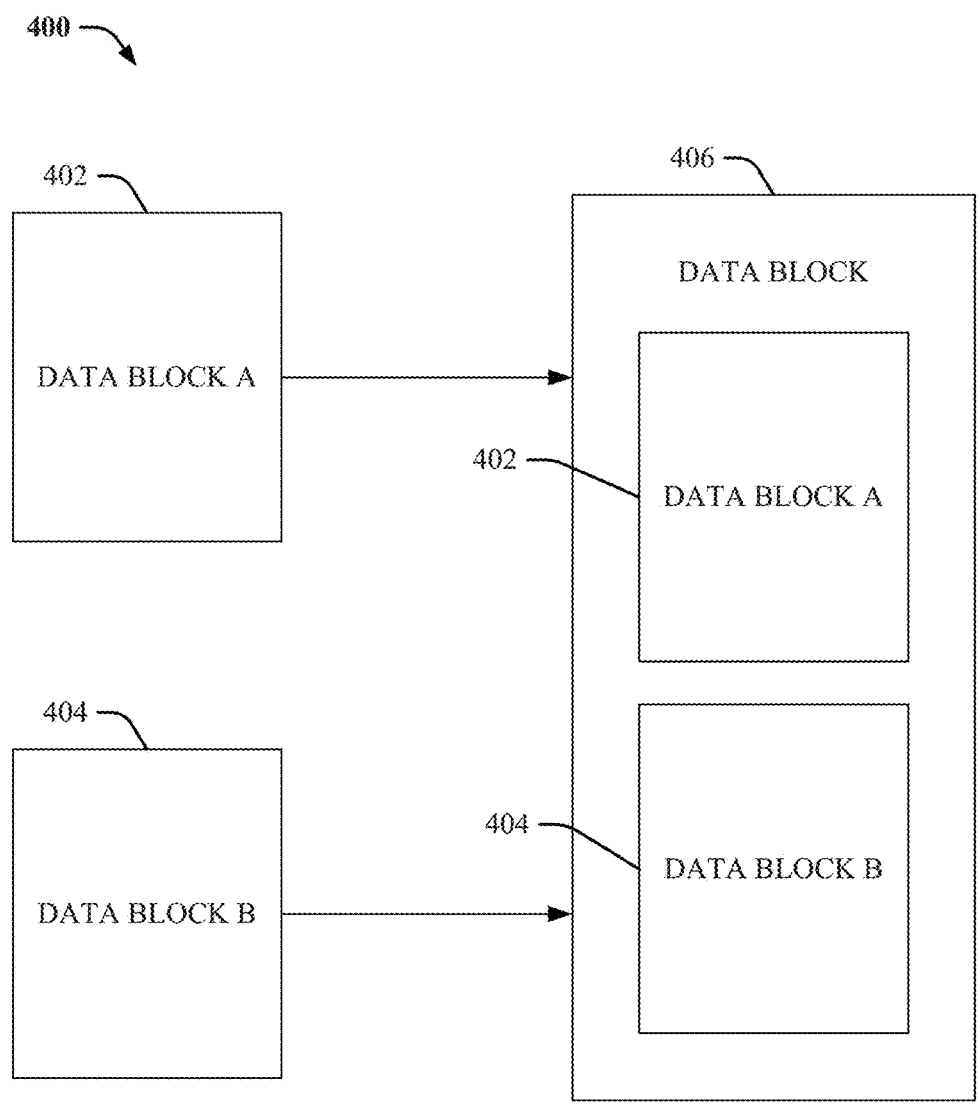
FIG. 4 illustrates a block diagram of an example, non-limiting system that forms a data blockchain from separate sets of data in accordance with one or more embodiments described herein.

Turning now to FIG. 4, illustrated is block diagram 400 of an example, non-limiting set of data blocks that forms a data blockchain from separate sets of data in accordance with one or more embodiments described herein. Repetitive description of like elements employed in other embodiments described herein is omitted for sake of brevity.

The blockchain system (e.g., blockchain system 102), when collecting data (as described in step 304 above) can gather data from separate data sets such as data block A 402 and data block B 404 and form a larger data block 406 that comprises the data blocks 402 and 404.

In an embodiment, the data collected, that is used to generate data blocks 402 and 404, can be associated with the data from the research project or experiment, and can include data that was collected from a project or experiment that was formerly conducted, or data that is collected as the project or experiment is proceeding. As an example, data block A 402 can be associated with data received from a first experiment, and data block B 404 can be associated with data received from a second experiment, or a second run of the first experiment. The data can include data collected from one or more scientific instruments, from people providing feedback (e.g., interviews, observational data, etc) or other data retrieved via online assessments, data harvesting, big data collection, and etc.

In an embodiment, the data collected can be separated into datasets e.g., data block A 402 and data block B 404 from individuals, groups of researchers, or different experiments or the same experiments conducted at different times. In an embodiment, the blockchain system can generate a block comprising the data, and in other embodiments, the blockchain system can generate separate datasets blocks, wherein one or more of the separate datasets is formed into a block. The blocks can comprise a data portion and a header, with the header comprising the project ID and other information that can be used to link the blocks together. In an embodiment, one or more of the blocks can be formed into a blockchain to preserve the data and make it resistant to modification.

In some embodiments, the data in one or more of data blocks A and B 402 and 404 can be encrypted. In some embodiments, some or all of the data in a block can be encrypted, or in other embodiments, to protect the source of the data, the header can be encrypted while the data portion of the block is unencrypted.

The data blocks in the blockchain (e.g., data blocks 402 and 404) can include hashes in the headers of the preceding datablocks. The hashes can link one or more block to each other and also provide a way to determine if any data modifications have been performed. The blockchain system can compare the hashes, and if the hashes do not match each other, it can indicate that a modification or alteration to the data block with the mismatched hash has been performed.

Figure 5:
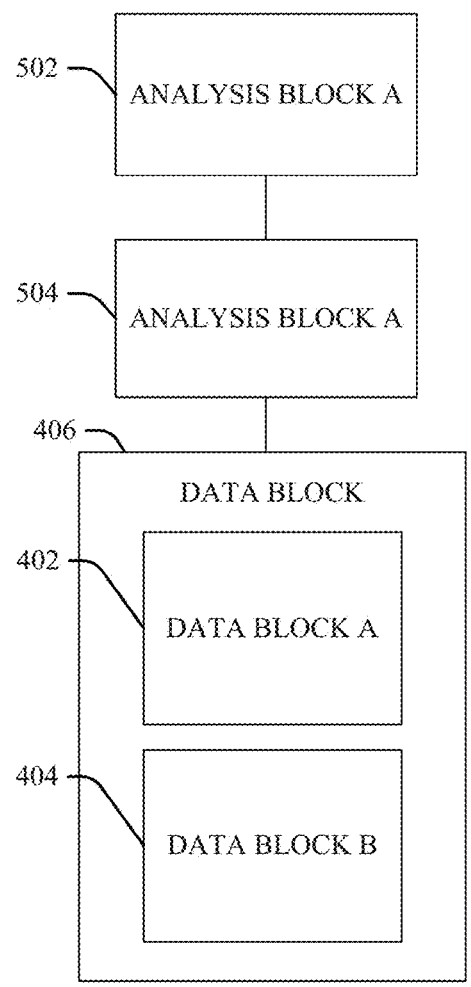
FIG. 5 illustrates another block diagram of an example, non-limiting system that forms an analysis blockchain in accordance with one or more embodiments described herein.

Turning now to FIG. 5, illustrated is another block diagram 500 of an example, blockchain in accordance with one or more embodiments described herein. Repetitive description of like elements employed in other embodiments described herein is omitted for sake of brevity.

The blockchain system 102 can join analysis blocks A and B (504 and 502 respectively) to the data blockchain 406. The analysis blocks 502 and 504 can be joined as various processing steps and/or computation algorithms are performed on the data collected in data blocks 402 and 404. In other embodiments, the analysis blocks 502 and 504 can be formed after the experiment is conducted based on the logs of the researchers, scientists, and/or other personnel involved in the data analyses.

The logs can include notes written by the researchers documenting the types of data analyses performed and the results of the analyses and transcribed or otherwise transformed into an electronic form and collected by blockchain system. In other embodiments, the logs can be obtained from a researcher console, or other application that performed during the analysis steps.

One or more of the analysis blocks 502 and 504 can correspond to different sets of analyses performed on the data. For instance, if a first calculation is performed and a result is obtained, analysis block 504 can document and record the analysis. Then, separately, or based on the result of the first calculation, if a second calculation and second result is obtained, the analysis block 502 can document and record the analysis and outcome of the second calculation. In other embodiments, one or more of the analysis blocks 502 and 504 can document all or part of the analyses performed on data blocks 402 and 404 respectively. In an embodiment the data or the headers of the analysis blocks 502 and 504 can be encrypted.

One or more of the analysis blocks 502 and 504 can have headers that comprise information relating to the source of the log file or identity of the researcher or research group, a time stamp, and a hash or link of or to the previous block. For instance, analysis block 504 can include a link to the previous data block, and block 502 can include a link to block 504.

In an embodiment, the blockchain can be linear, where the data is collected first, and then the analysis blocks are added linearly to the blockchain based on the order in which they are added to a database or ledger. In other embodiments, the blockchain can bifurcate as processing is performed and documented on datasets as they are gathered before one or more of the data sets are gathered. In such an embodiment, as an example, analysis block 502 can link directly to data block 402, and analysis block 504 can link directly to data block 404.

Figure 6:
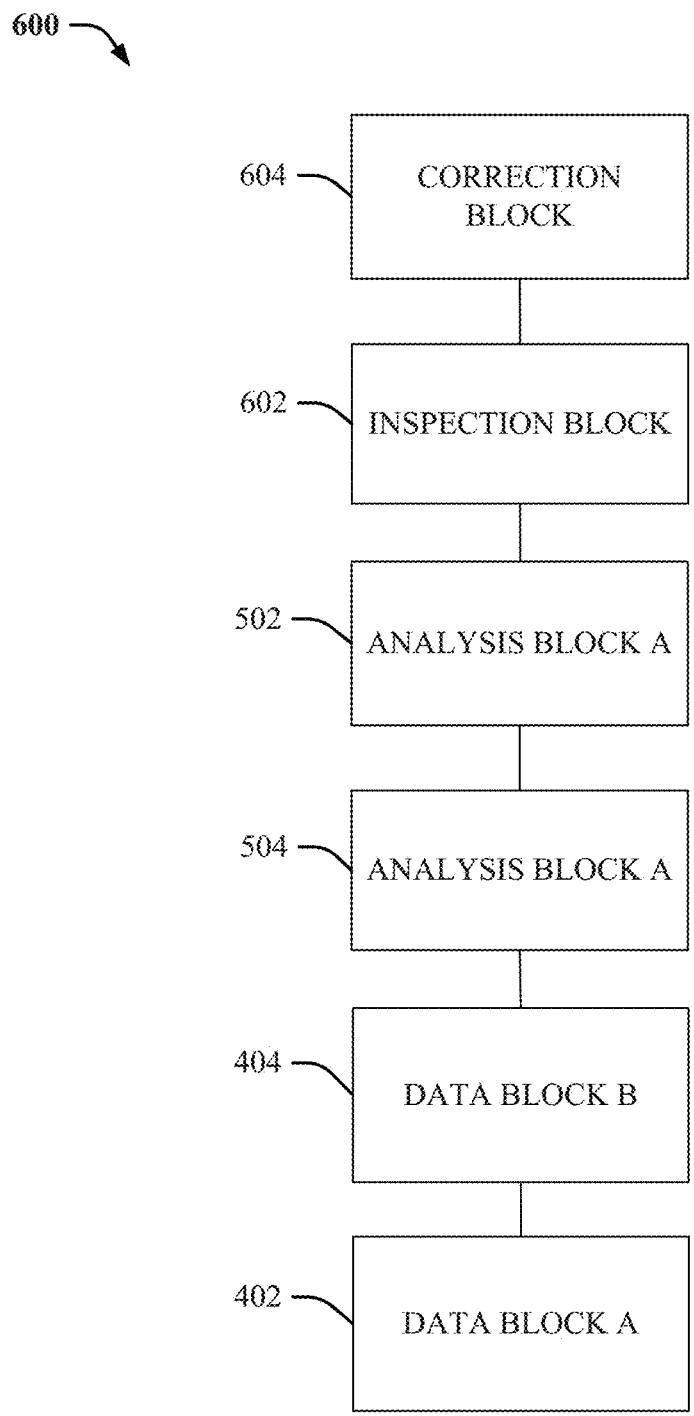
FIG. 6 illustrates another block diagram of an example, non-limiting open research blockchain in accordance with one or more embodiments described herein.

Turning now to FIG. 6, illustrated is another block diagram 600 of an example, non-limiting open research blockchain in accordance with one or more embodiments described herein. Repetitive description of like elements employed in other embodiments described herein is omitted for sake of brevity.

Diagram 600 depicts an example blockchain created by the blockchain system comprising an example set of blocks, including data blocks 402 and 404, analysis blocks 504 and 502, inspection component 602, and correction block 604.

The data blocks 402 and 404 can comprise the research/experimental data collected by one or more of the experiments, instruments, interviews, and other collection methods. The data in data blocks 402 and 404 can correspond to data from separate experiments, different runs, different researchers and/or participants and etc. The analysis blocks 502 and 504 can document the analyses performed on the data in data blocks 402 and 404, and can comprise information related to modifications of scripts performed on the data blocks over time. For instance, if a data processing/modeling script is performed on either data in data block 402 or 404, the result of the script, and information about the script can be stored, logged, or otherwise documented in analysis block 504. If the script is modified or otherwise altered in anyway, or the same script is performed on a different set of data, the results and information about the script can be documented in analysis block 502.

Inspection component 602 can comprise a summary of the analyses performed, results obtained, and other conclusions obtained in the previous blocks in the blockchain. In an embodiment, the inspection component can also comprise the headers of the data blocks and the analysis blocks to link back to. In an additional embodiment, the inspection component can have a header that includes a hash that is the hash of the last analysis block.

In another embodiment, the blockchain system can include one or more protocols whereby the inspection component 602 is not added to the blockchain or otherwise registered until it is confirmed that the inspection component incorporates the outputs of the analyst blocks and their hashes. Including the hashes ensures that not only the identify of which block in the blockchain results in the outcome, but that you can also verify the reliability of the block and the outcome with the hash. As an example, the inspection component can comprise the console outputs of the researchers which can be linked back to the analysis blocks 502 and 504. The hashes of the analysis blocks can be compared to the hashes of the console output to verify that no other modifications or alterations to the results and logs have been made.

The correction block 604 can comprise a weighting or relative importance ranking of the results obtained during the analysis blocks and inspection component. For instance, if relatively few analyses steps or modifications of the data processing algorithms are required to achieve the hypothesized result, then the experiment or research conclusion can have a more highly weighted importance than if many modifications are performed. The blockchain system can determine how many modifications are performed by determining which of the analysis blocks resulted in the outcome—if an early analysis block resulted in the outcome, than the result can be weighted higher than if a later analysis block resulted in the outcome. The blockchain system can also determine the weighting based on the types of modifications reported in the analysis blocks 502 and 504.

Figure 7:
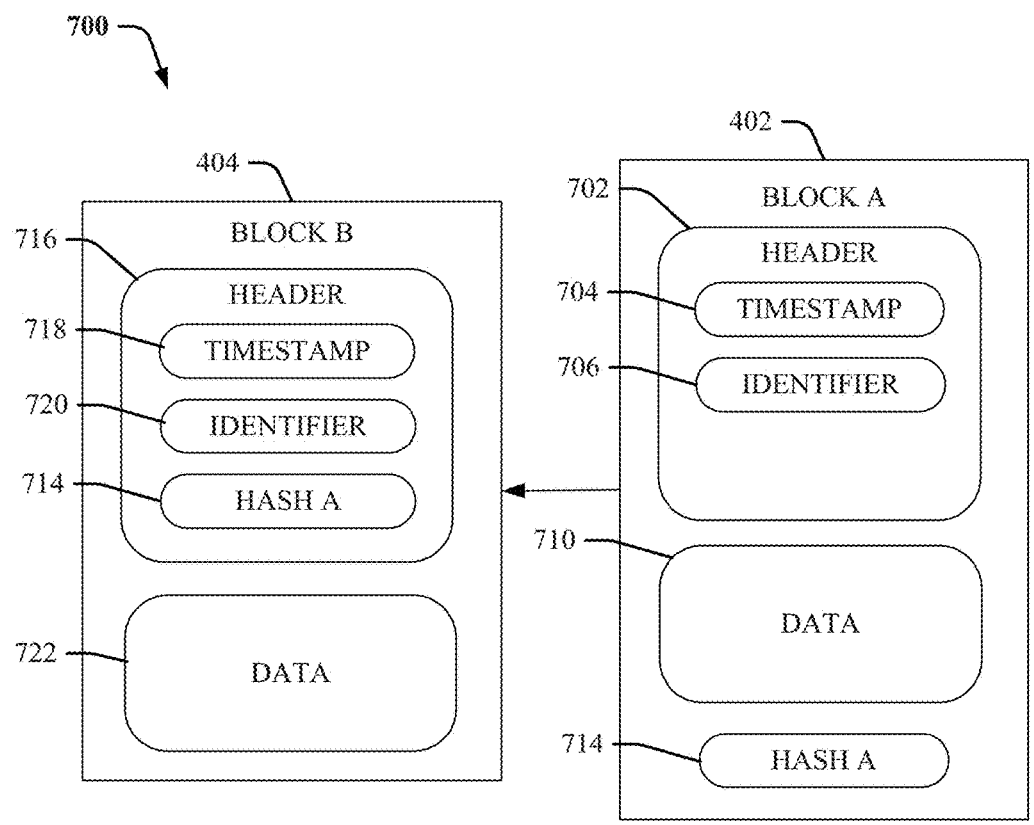
FIG. 7 illustrates another block diagram of an example, non-limiting system of headers and data portions of a data blockchain in accordance with one or more embodiments described herein.

Turning now to FIG. 7, illustrated is another block diagram 700 of an example, non-limiting system of headers and data portions of a data blockchain in accordance with one or more embodiments described herein. Repetitive description of like elements employed in other embodiments described herein is omitted for sake of brevity.

Diagram 700 depicts the structure of data blocks 402 and 404. It is to be appreciated that the structure of blocks 402 and 404 can apply to other blocks in the blockchain (e.g., analysis blocks 502 and 504, inspection component 602 and correction block 604).

In an embodiment, one or more of blocks 402 and 404 can include a header 702 and 716 respectively, as well as a data portion 710 and 722 respectively. The headers 702 and 716 can include information identifying the researcher, research group, experiment or project (identifiers 706 and 720). The data blocks 402 and 404 can also include a timestamp 704 and 718 that identify the time that the data blocks were formed on the server, or the sets of data in data portions 710 and 716 were received by the server or collected.

Data block 402 can also include a hash A 714 that is a number of a predefined length that is received in response to a hash function performing a hash of the data in data portion 710 or in an embodiment, of some or all the data in the data block 402, including the header 702. The hash is a unique number based on the content of the data, and even small modifications to the data can result in hash numbers that are distinctly different.

The hash A 714 of data block 402 can be included in the header of subsequent block 404. By linking the hash A 714 in 404, the blockchain is formed, and any modifications of data would result in the hashes not matching, breaking the blockchain.

In various embodiments, the headers 702 and 716 may also include URLs linking to data in one or more public or non-public databases/ledgers.

In an embodiment, the headers 702 and 716 or the data portions 710 and 722 can be encrypted to protect sensitive information. The researcher ID can be linked to a public key which can facilitate decryption of the encrypted data and/or header. In some embodiments, the data can be encrypted while the headers, with the hashes and identifiers are not encrypted. This can allow the researcher to make the data non-public, while enabling peer reviewers to replicate the results using the encrypted data.

Figure 8:
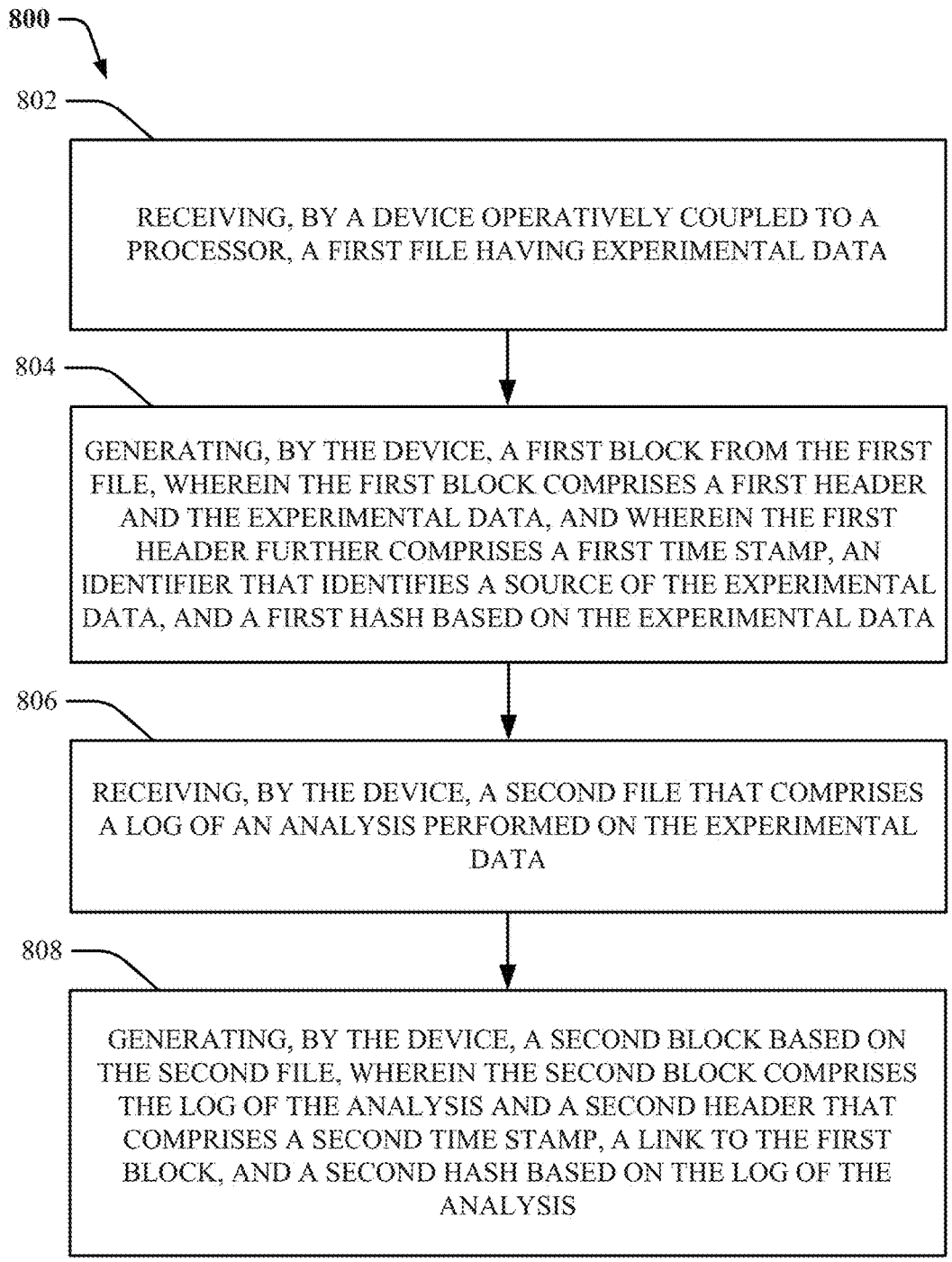
FIG. 8 illustrates a flow diagram of an example, non-limiting computer-implemented method that forms a blockchain based on research data and analysis in accordance with one or more embodiments described herein.

Turning now to FIG. 8, illustrated is a flow diagram 800 of an example, non-limiting computer-implemented method that forms a blockchain based on research data and analysis in accordance with one or more embodiments described herein.

The method can begin at 802, where the method includes receiving, by a device operatively coupled to a processor, a first file having experimental data (e.g., by data collection component 106). The first file can be received from a public database or ledger or from a non-public database. The file can include one or more data sets that correspond to respective participants or experiments performed.

The method can continue at 804, where the method includes generating, by the device, a first block from the first file, wherein the first block comprises a first header and the experimental data, wherein the header further comprises a first time stamp, an identifier that identifies a source of the experimental data, and a first hash based on the experimental data (e.g., by data collection component 106). The first block can be comprised of many blocks corresponding to one or more of the separate data sets. One or more of the blocks can have respective headers with respective time stamps, identifiers, and hashes. The hashes of the data portions of a preceding block can be included in the header of the subsequent block to provide a link in the blockchain, and to also provide reliability and tamper resistance to the blockchain.

The method can continue at 806, where the method includes receiving, by the device, a second file that comprises a log of an analysis performed on the experimental data (e.g., by analysis component 108). The log of the analysis can include some or all of the data analyses and scripts relating to the processing as well as the results of the data analyses.

The method continues at 808, where generating, by the device, a second block based on the second file, wherein the second block comprises the log of the analysis and a second header that comprises a second time stamp, a link to the first block, and a second hash based on the log of the analysis (e.g., by analysis component 108).

Figure 9:
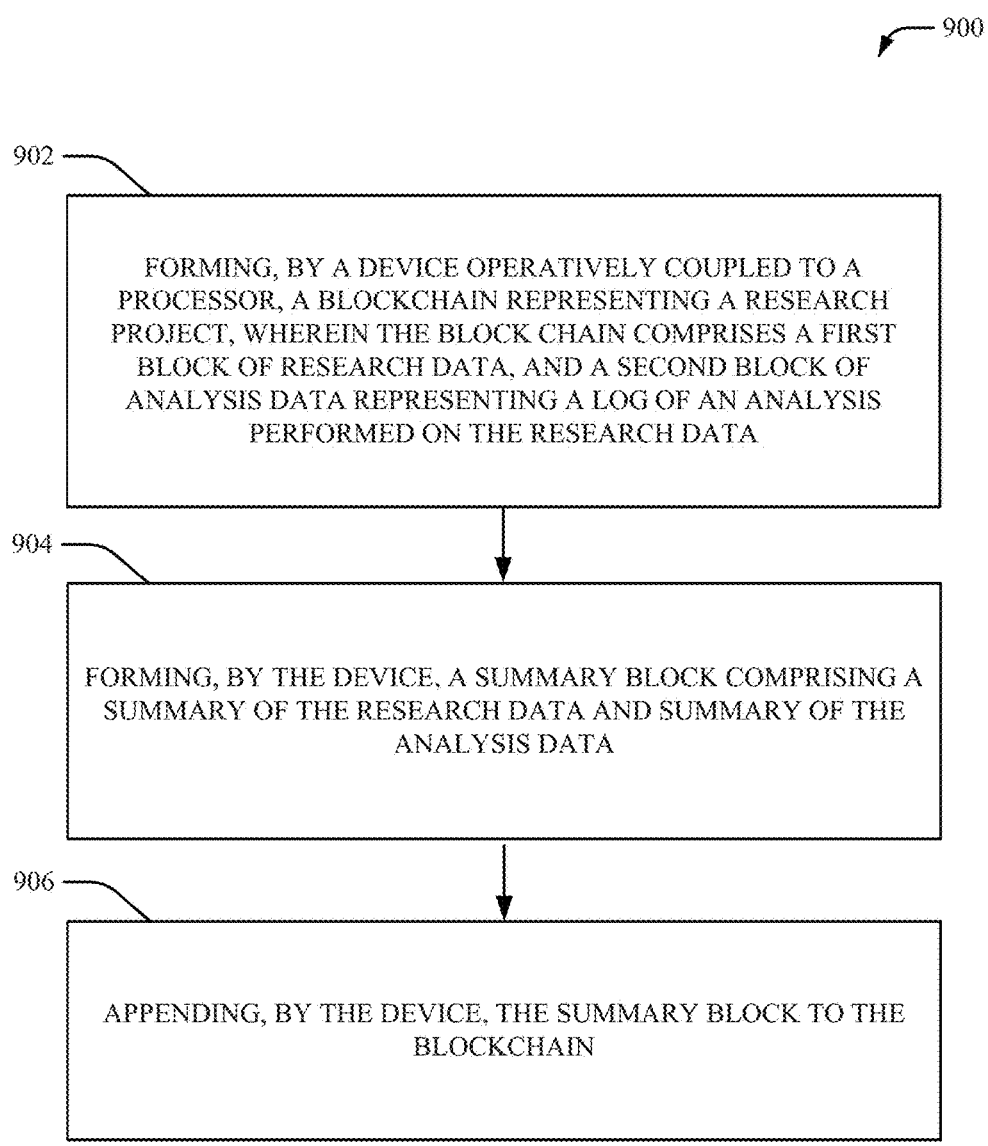
FIG. 9 illustrates another flow diagram of an example, non-limiting computer-implemented method that forms a blockchain based on research data and analysis in accordance with one or more embodiments described herein.

Turning now to FIG. 9, illustrated a flow diagram 900 of an example, non-limiting computer-implemented method that forms a blockchain based on research data and analysis in accordance with one or more embodiments described herein. Repetitive description of like elements employed in other embodiments described herein is omitted for sake of brevity The method can begin at 902, where the method includes forming, by a device operatively coupled to a processor, a blockchain representing a research project, wherein the blockchain comprises a first block of research data, and a second block of analysis data representing a log of an analysis performed on the research data (e.g., by data collection component 106 and analysis component 108).

The method can continue at 904, where the method includes forming, by the device, a summary block comprising a summary of the research data and summary of the analysis data (e.g., by inspection component 110).

The method can continue at 906, where the method includes appending, by the device, the summary block to the blockchain (e.g., by inspection component 110).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processors and/or an assignment component is established from a combination of electrical and mechanical components and circuitry, a human is unable to replicate or perform the subject data packet configuration and/or the subject communication between processors and/or an assignment component. For example, a human is unable to generate data for transmission over a wired network and/or a wireless network between processors and/or an assignment component, etc. Moreover, a human is unable to packetize data that can include a sequence of bits corresponding to information generated during a machine learning process (e.g., a blockchain formation process), transmit data that can include a sequence of bits corresponding to information generated during a machine learning process (e.g., a corresponding to information generated during a machine learning process (e.g., a blockchain formation process), etc.

Figure 10:
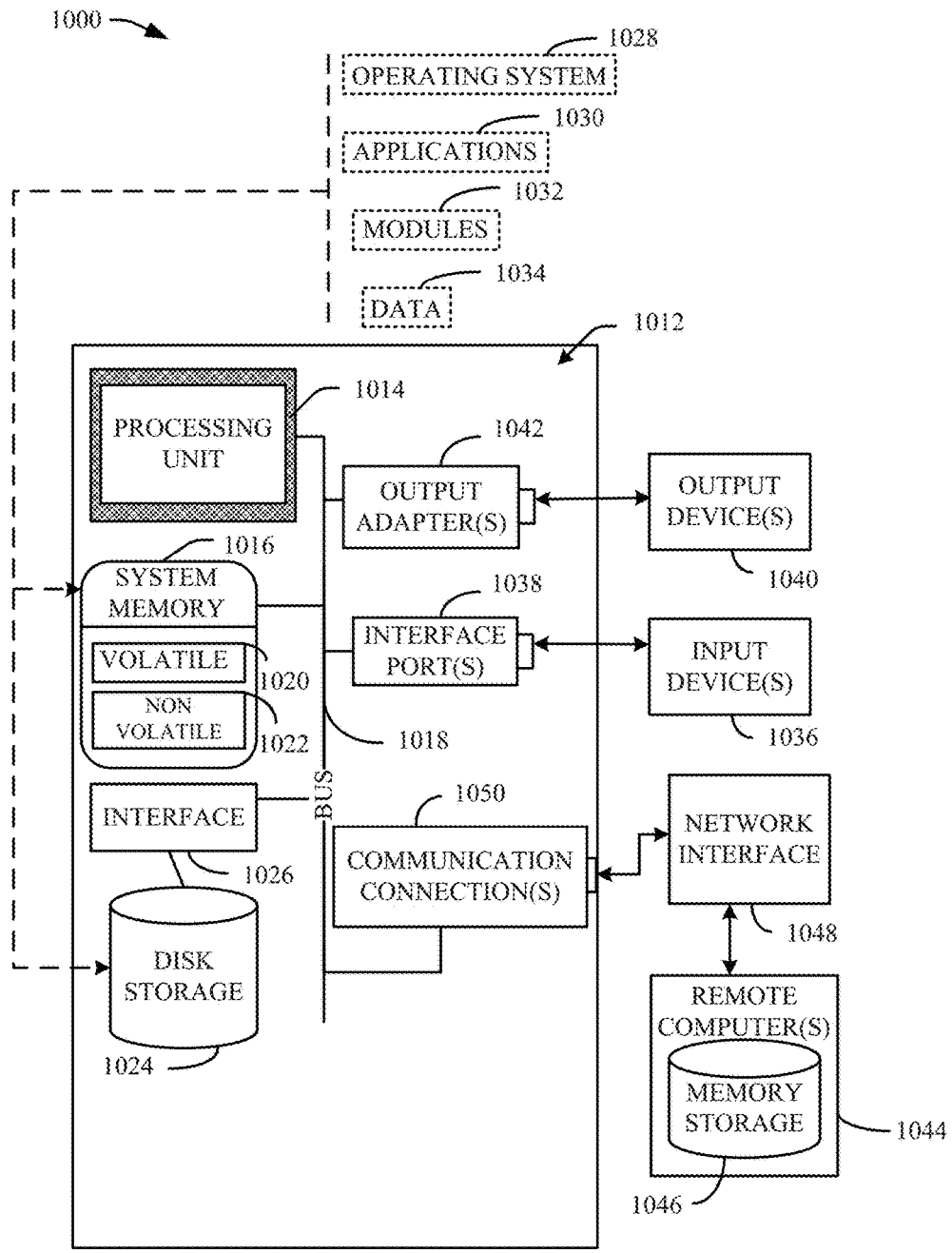
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processor 1014, a system memory 1016, and a system bus 1018. The system bus 1018 couples system components including, but not limited to, the system memory 1016 to the processor 1014. The processor 1014 can be any of various available processors. Dual microprocessors and other multiprocessor architectures also can be employed as the processor 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. An entity enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
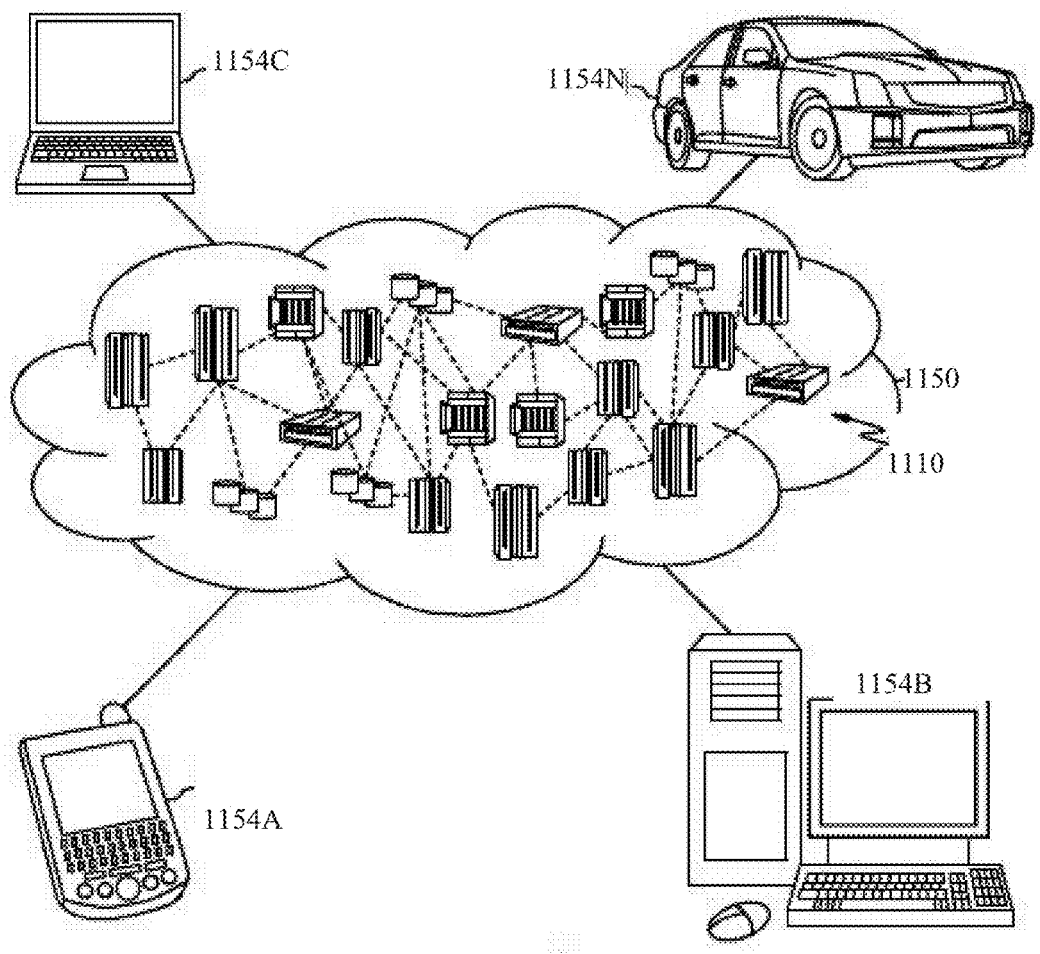
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1654A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
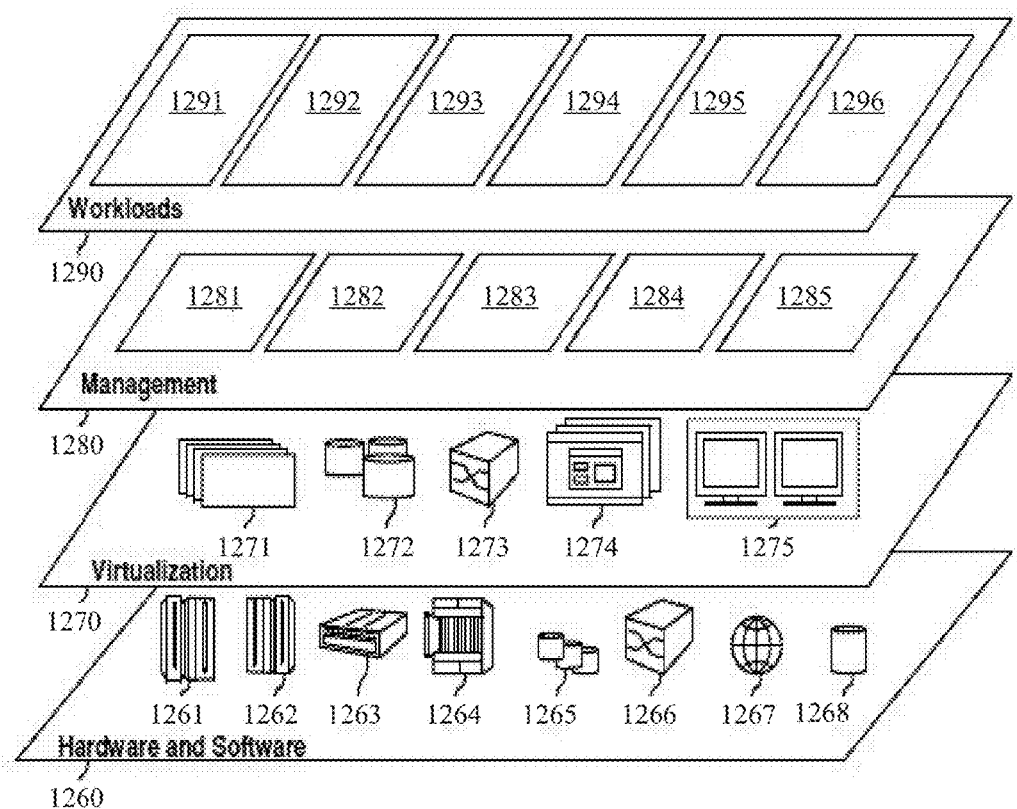
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and transaction model software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data analyses apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processor or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processors. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by a device operatively coupled to a processor, a first block from a first file, wherein the first block comprises a first header and experimental data is comprised within the first file, wherein the first header further comprises a first time stamp, an identifier that identifies a source of the experimental data, and a first hash based on the experimental data; and
   generating, by the device, a second block based on a second file that comprises a log of an analysis performed on the experimental data, wherein the second block comprises the log of the analysis and a second header that comprises a second time stamp, a link to the first block, and a second hash based on the log of the analysis.

2. The computer-implemented method of claim 1, further comprising:
   forming, by the device, a blockchain based on the first block and the second block.

3. The computer-implemented method of claim 1, further comprising:
   transmitting, by the device, the first block and the second block to a ledger database.

4. The computer-implemented method of claim 1, further comprising:
   generating, by the device, a third block comprising a summary of the experimental data and the analysis and a result of the analysis; and
   joining, by the device, the third block to a blockchain associated with the first block and the second block by placing a link to the second block in a third header of the third block.

5. The computer-implemented method of claim 4, further comprising:
   performing, by the device, a correction to the result of the analysis based on a review of the summary of the experimental data of the third block;
   generating, by the device, a fourth block comprising the correction; and
   joining, by the device, the fourth block to the blockchain.

6. The computer-implemented method of claim 5, further comprising:
   matching, by the device, respective hashes of the first block, the second block, the third block, and the fourth block, to corresponding hashes of corresponding blocks in a ledger database.

7. The computer-implemented method of claim 1, further comprising:
   encrypting, by the device, the experimental data and the log of the analysis prior to forming the first block and second block respectively.

8. The computer-implemented method of claim 1, wherein the second block comprises information relating to a data processing script associated with the experimental data, and wherein the method further comprises:
   generating, by the device, a fifth block comprising information relating to a result of an execution of the data processing script.

9. The computer-implemented method of claim 1, wherein the generating the first block further comprises:
   generating the first block based on a combination of a plurality of data blocks.

10. A computer-implemented method, comprising:
   forming, by a device operatively coupled to a processor, a blockchain representing a research project, wherein the blockchain comprises a first block of research data, and a second block of analysis data representing a log of an analysis performed on the research data;
   forming, by the device, a summary block comprising a summary of the research data and summary of the analysis data; and
   appending, by the device, the summary block to the blockchain.

11. The computer-implemented method of claim 10, further comprising:
   rating, by the device, a reliability of a research result associated with the analysis data, wherein the reliability is based on the summary of the analysis data and the log of the analysis and is associated with a number of modifications to an analysis procedure.

12. The computer-implemented method of claim 10, wherein the forming the blockchain further comprises:
   generating, by the device, the first block of research data comprising a first header and the research data, wherein the header further comprises a first time stamp, an identifier that identifies a source of the research data, and a first hash based on the research data; and
   generating, by the device, the second block of analysis data comprising the log of the analysis and a second header that comprises a second time stamp, a link to the first block of research data, and a second hash based on the log of the analysis.

13. The computer-implemented method of claim 12, wherein the link to the first block is the first hash.

14. The computer-implemented method of claim 10, further comprising:
   retrieving, by the device, the first block of research data and the second block of analysis data from a public database.

\* \* \* \* \*